Figure 1:
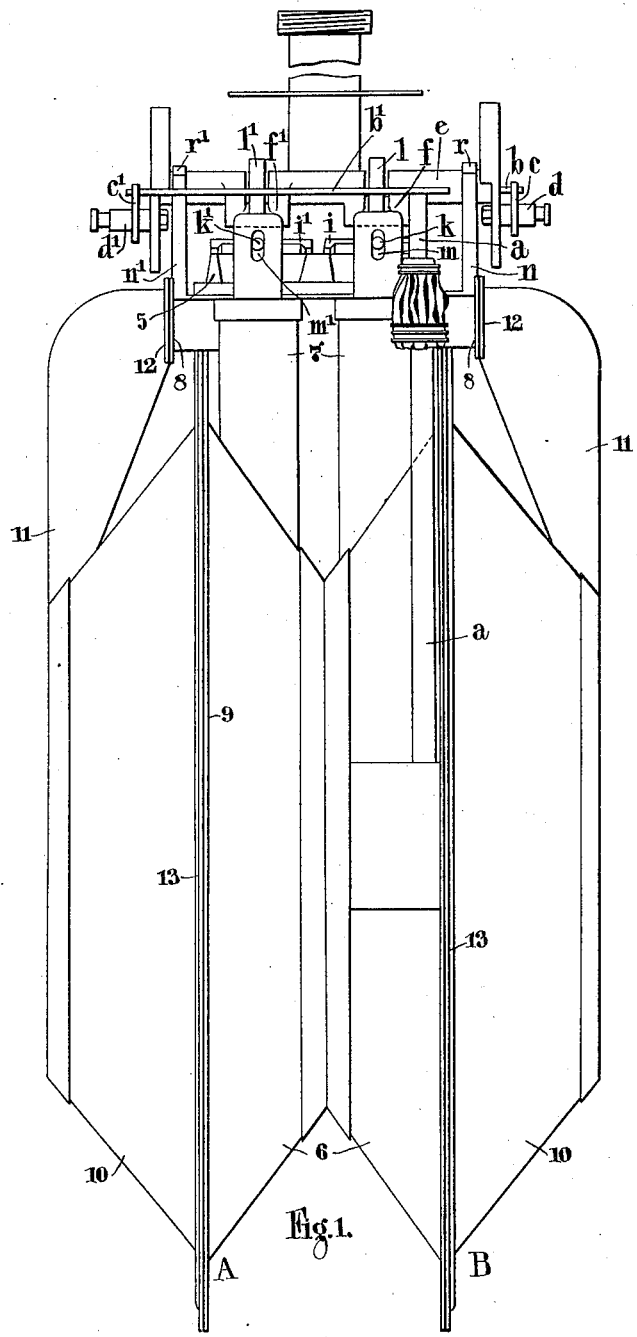

C. E. HIBBERD.
GAS METER.
APPLICATION FILED FEB. 24, 1913.

1,092,048.

Patented Mar. 31, 1914.
3 SHEETS—SHEET 1.

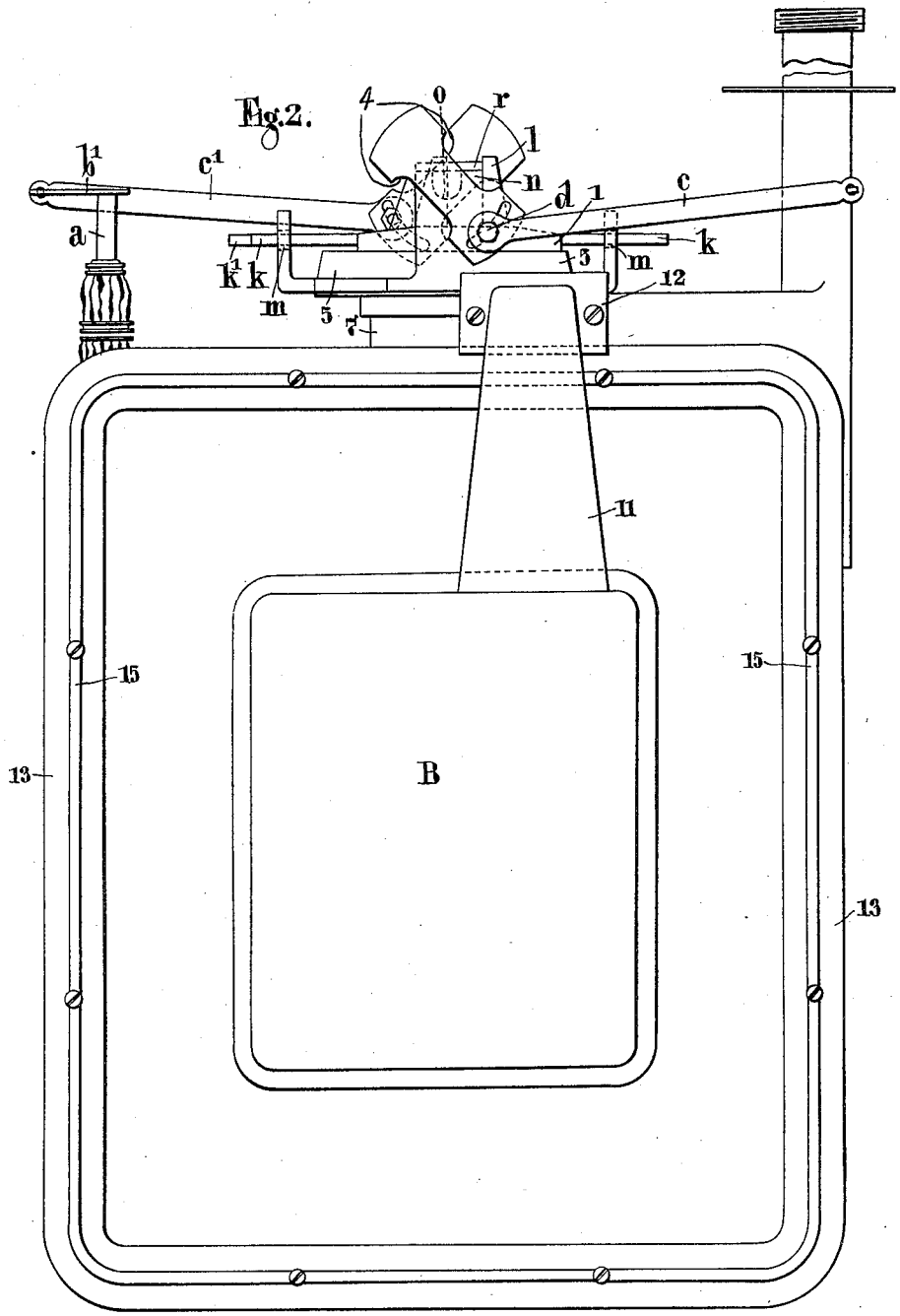

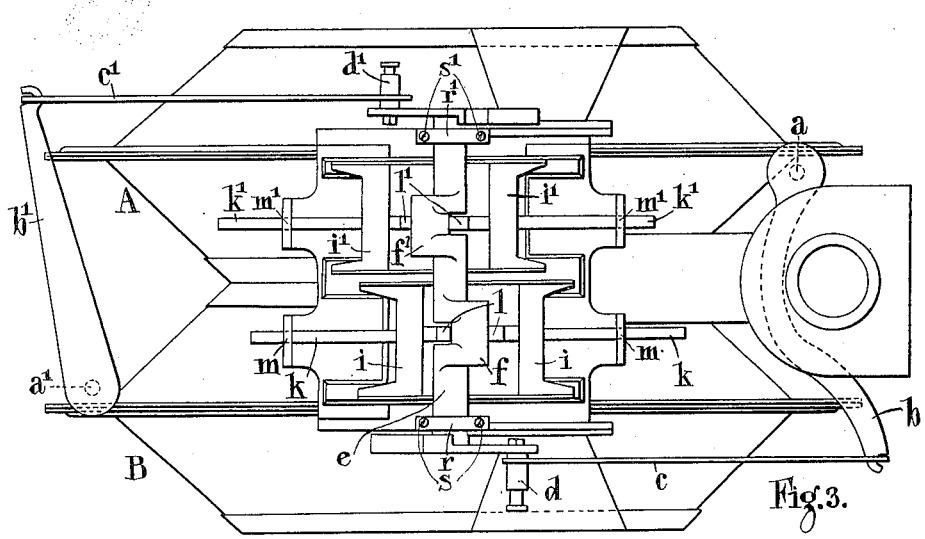
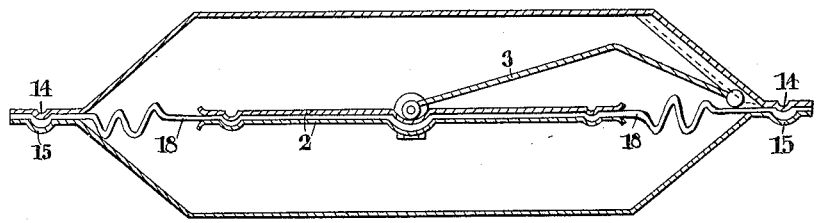
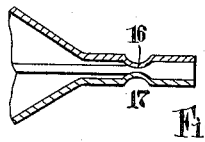

UNITED STATES PATENT OFFICE.

CHARLES EDWIN HIBBERD, OF LONDON, ENGLAND, ASSIGNOR OF THREE-TENTHS TO FREDERICK LOCKHART GOAD, OF EDINBURGH, SCOTLAND.

GAS-METER.

1,092,048.  Specification of Letters Patent.  Patented Mar. 31, 1914.

Application filed February 24, 1913. Serial No. 750,318.

*To all whom it may concern:*

Be it known that I, CHARLES EDWIN HIBBERD, a subject of the King of Great Britain and Ireland, and residing at 79 Mantilla road, Tooting Bec, London, S. W., England, have invented certain new and useful Improvements in and Relating to Gas-Meters, of which the following is a specification.

The invention relates to dry gas meters of the type having a plurality of measuring chambers each controlled by its own reciprocating valve driven from a diaphragm.

One object of the present invention is to simplify the construction of such a meter so that it can be more readily disconnected or assembled for purposes of repair and so forth.

Another object is to provide an improved gas meter which shall give more accurate indications over comparatively large ranges of pressure and consumption.

With one or other of these objects the main features of the present invention may be summarized as follows:—(a) a gas meter in which the intermediate members between the usual rotating spindle and the valves are omitted and the valves are reciprocated by cranks, cams or the like engaging directly with suitable members on the valves themselves, such cranks, cams or the like being rotatable in a constant direction from the diaphragms by way of suitable mechanism; (b) a gas meter having in combination a plurality of measuring chambers, each containing a diaphragm oscillating about its central position of support within extreme positions defined or approximately defined by the walls of the chambers, and valves controlling flow of gas to and from the measuring chambers, such valves being driven from a crank-shaft or the like operated from the diaphragms, the crank pin or pins being adjusted or adjustable circumferentially so as to cause the valves to close in advance of the dead points and open immediately on the return motion of their respective driving elements; (c) a gas meter with diaphragm chambers, the front members of which have flanged gas ducts integral therewith and associated with the corresponding flanged parts by readily detachable fastenings; (d) a gas meter of the type indicated in which the flanges of the measuring chambers or of the diaphragm plates are provided with co-acting semi-circular or like curved beads or grooves either similarly or oppositely disposed.

Referring to the accompanying drawings: Figure 1 shows an end view of the measuring chambers according to one form of the invention and the valve-operating mechanism, Fig. 2 being a corresponding side view, and Fig. 3 a plan; Fig. 4 is a section through one of the measuring chambers showing diaphragm and flag, while finally Fig. 5 is a detail view.

In carrying the invention into effect according to the form shown by way of example, two measuring chambers, A and B, are arranged as is usual in this class of meter back to back. The two chambers being similar, only one will be described in detail, corresponding parts of the other being denoted in general by the same letters accented.

Taking the left hand chamber A, by way of example, it is provided with the usual diaphragm, 2, flag, 3, (see Fig. 4), and flag rod, $a$, the latter being arranged vertically. The flag rod, $a$, at its upper end has rigidly attached to it an arm or lever, $b$, extending in a transverse direction and coupled by a link, $c$, to a crank-pin, $d$, mounted on the end of a shaft or spindle, $e$, arranged across the two measuring chambers on the top thereof. The position of each such crank-pin is adjusted or adjustable circumferentially along the groove, 4, in relation to its corresponding crank so as to cause the valves to close in advance of the dead points, and open immediately on the return motion of their respective driving elements, thereby enabling small errors in the rate of registration of the meter to be corrected. The spindle itself is provided with two cranks, $f, f'$, set preferably at right angles and passing between horns or projections, $l, l'$, on the valves, $i, i'$, themselves, which are arranged below the spindle and are reciprocated side by side lengthwise of their respective measuring chambers. These valves may work in conjunction with a valve base, 5, and may be prevented from rising by rods, $k, k'$, at each end working through eyes, $m, m'$, or by any other suitable means. The valves themselves are preferably of the D-type and are provided with a moderate amount of both outside and inside lap.

The transverse spindle $e$ carrying the eccentrics is mounted in brackets, n, n', one at each end. According to one construction, each such bracket has a slot or recess, o, at the top, in which the spindle rests, a cap, r, secured by screws, s, s, being provided to hold the spindle in place.

The two back members, 6, 6, of the measuring chambers, A, B, are permanently united and inseparably connected by suitable ducts, 7, 7, to the valve base, 5, such parts being preferably riveted or soldered together. The valve base, 5, is provided with vertical flanges, 8, 8, parallel to the usual flanges, 9, 9, on the back members of the measuring chambers. The front members, 10, 10, of these chambers are specially constructed to correspond to the arrangement of parts described above. Each front member is provided respectively with an upstanding duct, 11, terminating in a vertical flange, 12, parallel to the flange, 13, by which it is attached to its corresponding back member, the duct flanges, 12, being arranged to correspond with the similar flanges, 8, on the valve base.

In order to secure a gas-tight joint between the front and back members of the measuring chambers, the flanges, 9 and 13, of these members may be provided with grooves or bearings, 14, 15, running along the length of the flanges and clear of the edges thereof the co-acting semi-circular or like curved grooves of corresponding flanges either being similarly arranged so that the convex side of one fits into the concave side of the other, (see Fig. 4), or as shown in Fig. 5, the grooves, 16, 17, may be oppositely arranged preferably so that the two convex sides are disposed toward one another. This construction not only serves to make a gas-tight joint, but also to stiffen the flanges themselves. A similar construction may be applied to the flanges or peripheral portions of the diaphragm plates or vanes, 2, 2, (see Fig. 4), the latter being clamped together one on each side of the diaphragm, 18, in any suitable manner.

The construction of parts above described renders it easy to take the meter to pieces for repairs to the diaphragm or associated parts, since for each measuring chamber, only what is in effect one joint has to be broken. It will moreover be seen that none of the valve driving mechanism has to be removed to obtain access to the diaphragm chambers. The direct operation of the valves from the cranks, f, f', lessens the number of parts while the circumferential adjustment of the crank pins taken in conjunction with the particular type of diaphragm described, gives a meter which can be made to register correctly under varying conditions. Any other suitable disposition of the valve and spindle in relation to the flag rods may likewise be adopted while other forms or shapes of measuring chamber may be used. I wish it to be understood, moreover, that apart from the illustrative forms of my invention described, many other embodiments can be employed without departing from the principle of the invention.

Having now described my invention what I claim as new and desire to secure by Letters Patent is:—

1. In combination in a gas meter, a plurality of measuring chambers having movable diaphragms therein; a plurality of reciprocating valves having driving members in rigid relation thereto, said valves, one to each chamber, controlling flow of gas to and from said chambers; a rotatable spindle or shaft common to said plurality of valves and having different eccentric portions engaging respectively with the driving members of said valves to actuate the same, together with operative interconnections between said diaphragms and said spindle or shaft.

2. In combination in a gas meter, a plurality of measuring chambers having movable diaphragms therein; reciprocating valves controlling flow of gas to and from said chambers, said valves being provided with integral projections; a rotatable spindle or shaft having eccentric portions directly engaging with said valve projections, together with operative interconnections between said diaphragms and said spindle or shaft.

3. In combination in a gas meter, a plurality of measuring chambers having movable diaphragms therein; valves controlling flow of gas to and from said chambers, said valves being reciprocable side by side in parallel lines; a rotatable spindle or shaft disposed transversely to the line of motion of said valves and directly operating said valves together with operative inter-connections between said diaphragms and said spindle or shaft.

4. In combination in a gas meter, a plurality of measuring chambers; a diaphragm in each of said chambers supported to oscillate about a central position between extreme positions defined by the walls of the corresponding chamber; valves controlling flow of gas to and from said chambers; a rotatable crank-shaft driving said valves; crank pin means on said shaft and operative interconnections between said crank pin means and diaphragms, said crank pin means being positioned circumferentially in relation to said shaft to cause the valves to close in advance of the dead points.

5. In combination in a gas meter, a plurality of measuring chambers; a diaphragm in each of said chambers supported to oscillate about a central position between extreme positions defined by the walls of the corresponding chamber; valves controlling flow of gas to and from said chambers; a rotatable crank-shaft driving said valves; crank pin means on said shaft; operative interconnections between said crank pin means and diaphragms together with means for adjusting the position of said crank pin means circumferentially in relation to said shaft.

6. In combination in a gas meter, a plurality of measuring chambers each having front and back members connected by flanges situated in certain parallel planes; diaphragms in said chambers; valves controlling flow of gas to and from said chambers; a valve base having flanges disposed parallel to said certain planes and a gas duct integral with each of said back members and having flanges to co-act with said flanges on said valve base.

7. In combination in a gas meter, a plurality of measuring chambers each having front and back members connected by flanges; diaphragms in said chambers; valves controlling flow of gas to and from said chambers; a valve base having flanges and a gas duct integral with each of said back members and having flanges to connect with said valve base flanges.

8. In combination in a gas meter, a plurality of measuring chambers each having front and back members to form co-acting pairs; diaphragms movable in said chambers and clamped between co-acting diaphragm members; valves controlling flow of gas to and from said chambers; operative interconnections between said diaphragms and valves, together with means for jointing co-acting members, said means comprising flanges with coöperating beadings.

9. In combination in a gas meter, a plurality of measuring chambers, each having for jointing purposes front and back flanged members with beadings along the length of said flanges and clear of the edges thereof; diaphragms movable in said chambers; valves controlling flow of gas to and from said chambers and operative interconnections between said diaphragms and said valves.

10. In combination in a gas meter, a plurality of measuring chambers each having for jointing purposes front and back flanged members with beadings along the length of said flanges and clear of the edges thereof, the concavity of the beading on one flange being disposed within the convexity of the beading on the other flange; diaphragms movable in said chambers; valves controlling flow of gas to and from said chambers and operative interconnections between said diaphragms and said valves.

In testimony whereof I have signed my name to this specification in the presence of two subscribing witnesses.

CHARLES EDWIN HIBBERD.

Witnesses:
FREDERICK PIATT,
JAMES WHITELAW.

Copies of this patent may be obtained for five cents each, by addressing the "Commissioner of Patents, Washington, D. C."